(12) United States Patent
Turcotte

(10) Patent No.: US 10,732,366 B2
(45) Date of Patent: Aug. 4, 2020

(54) OPTICAL INTERCONNECT DEVICE INCLUDING A MULTI-FIBER CONNECTOR AND AN EDGE COUPLED CONNECTOR

(71) Applicant: Lumentum Operations LLC, Milpitas, CA (US)

(72) Inventor: Georges Turcotte, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/182,180

(22) Filed: Nov. 6, 2018

(65) Prior Publication Data

US 2019/0146168 A1  May 16, 2019

Related U.S. Application Data

(60) Provisional application No. 62/585,987, filed on Nov. 14, 2017.

(51) Int. Cl.
| | |
|---|---|
| *G02B 6/12* | (2006.01) |
| *G02B 6/25* | (2006.01) |
| *G02B 6/42* | (2006.01) |
| G02B 6/38 | (2006.01) |

(52) U.S. Cl.
CPC .............. *G02B 6/4292* (2013.01); *G02B 6/12* (2013.01); *G02B 6/4204* (2013.01); *G02B 6/25* (2013.01); *G02B 6/3822* (2013.01); *G02B 6/3885* (2013.01); *G02B 6/421* (2013.01); *G02B 6/4207* (2013.01); *G02B 6/4246* (2013.01); *G02B 2006/1209* (2013.01); *G02B 2006/12061* (2013.01)

(58) Field of Classification Search
CPC ...... G02B 6/4292; G02B 6/12; G02B 6/4204; G02B 2006/12061; G02B 2006/1209
See application file for complete search history.

(56) References Cited

U.S. PATENT DOCUMENTS

| | | | | |
|---|---|---|---|---|
| 5,574,814 | A * | 11/1996 | Noddings | G02B 6/4231 385/89 |
| 6,522,798 | B2 * | 2/2003 | Chiappetta | G02B 6/4201 385/14 |
| 6,611,635 | B1 * | 8/2003 | Yoshimura | G02B 6/12002 257/E23.01 |
| 7,366,380 | B1 * | 4/2008 | Peterson | G02B 6/4214 385/47 |

(Continued)

OTHER PUBLICATIONS

Ed Cady, "What are MPO connectors?", https://www.connectortips.com/what-are-mpo-connectors/, Jun. 2, 2016, 6 pages.

(Continued)

*Primary Examiner* — Akm E Ullah
(74) *Attorney, Agent, or Firm* — Harrity & Harrity, LLP

(57) ABSTRACT

An optical interconnect device may include a multi-fiber connector at a first end of the optical interconnect device. The optical interconnect device may include an edge coupled connector at a second end of the optical interconnect device. The optical interconnect device may include a plurality of optical fibers disposed inside the multi-fiber connector and the edge coupled connector to optically couple the multi-fiber connector to the edge coupled connector, wherein the multi-fiber connector and the edge coupled connector rigidly interconnect to structurally support the optical interconnect device.

20 Claims, 12 Drawing Sheets

(56) References Cited

U.S. PATENT DOCUMENTS

| | | | | |
|---|---|---|---|---|
| 7,729,581 B2* | 6/2010 | Rolston | | G02B 6/4232 |
| | | | | 385/49 |
| 8,727,635 B2* | 5/2014 | Livingston | | G02B 6/3825 |
| | | | | 385/50 |
| 8,757,893 B1* | 6/2014 | Isenhour | | G02B 6/3886 |
| | | | | 385/76 |
| 9,341,786 B1* | 5/2016 | Gamache | | G02B 6/30 |
| 9,838,132 B2* | 12/2017 | Jiang | | H04B 10/40 |
| 10,288,812 B1* | 5/2019 | Evans | | G02B 6/3636 |
| 10,353,157 B2* | 7/2019 | Fortusini | | G02B 6/43 |
| 2003/0087505 A1* | 5/2003 | Deane | | G02B 6/4292 |
| | | | | 438/422 |
| 2004/0120658 A1* | 6/2004 | McFarland | | G02B 6/4249 |
| | | | | 385/89 |
| 2007/0223865 A1* | 9/2007 | Lu | | G02B 6/4292 |
| | | | | 385/90 |
| 2010/0027941 A1* | 2/2010 | Stewart | | G02B 6/3817 |
| | | | | 385/57 |
| 2011/0222823 A1* | 9/2011 | Pitwon | | G02B 6/42 |
| | | | | 385/93 |
| 2012/0237168 A1* | 9/2012 | Aoki | | G02B 6/3821 |
| | | | | 385/71 |
| 2013/0064506 A1* | 3/2013 | Eberle, Jr. | | G02B 6/32 |
| | | | | 385/49 |
| 2014/0185980 A1* | 7/2014 | Lei | | G02B 6/12004 |
| | | | | 385/14 |
| 2014/0219612 A1* | 8/2014 | Butler | | G02B 6/4267 |
| | | | | 385/78 |
| 2018/0217326 A1* | 8/2018 | Brusberg | | G02B 6/122 |

OTHER PUBLICATIONS

Complete Connect, "MTP vs MPO Connectors", https://www.completeconnect.co.uk/mtp-vs-mpo-connectors-2/, May 28, 2018, 6 pages.

Chiral Photonics, Inc., "Coupling and Packaging Services", http://www.chiralprotonics.com/Web/coupling_packaging_services.html, Dec. 11, 2014, 4 pages.

Corning, "Terminated Fiber Array Unit Fan-Outs", https://www.corning.com/content/dam/corning/microsites/coc/oem/documents/CAH~110_AEN.pdf; Nov. 21, 2016, 3 pages.

* cited by examiner

OPTICAL INTERCONNECT DEVICE INCLUDING A MULTI-FIBER CONNECTOR AND AN EDGE COUPLED CONNECTOR

RELATED APPLICATION(S)

This application claims priority under 35 U.S.C. § 119 to U.S. Provisional Patent Application No. 62/585,987, filed on Nov. 14, 2017, the content of which is incorporated by reference herein in its entirety.

TECHNICAL FIELD

The present disclosure relates to connectors. More particularly, some aspects of the present disclosure relate to an optical interconnect device for components of transceivers.

BACKGROUND

An optical communications system may include a transceiver to transmit an optical signal, to receive an optical signal, and/or the like. For example, each node of the optical communications system may include at least one transceiver to enable each node to communicate with the other nodes of the optical communications system. A transceiver may include multiple component optical devices. For example, a single transceiver may include a photonic chip, a fiber array unit, and/or the like. In some cases, a set of lenses may be disposed inside the transceiver to couple the multiple component optical devices. In this case, a first component optical device may direct a beam or beams from an output of the first component optical device toward the set of lenses, and the set of lenses may redirect the beam or beams from the set of lenses to an input of a second component optical device. Care must be taken to provide sufficient space to accommodate the alignment process and care must be taken to properly align the two component optical devices and the set of lenses enabling the desired beam coupling.

As another example, a flexible cable, such as a ribbon cable, may be used to optically couple two component optical devices in a transceiver. For example, the first component optical device may be coupled to a first end of the ribbon cable, and the second component optical device may be coupled to a second end of the ribbon cable. In this case, the first optical device may provide multiple beams via multiple optical fibers of the ribbon cable, and the ribbon cable may direct the multiple beams to the second optical device using the multiple optical fibers. Care must be taken to provide sufficient space between the two component optical devices to accommodate the ribbon cable and any associated connectors thereof and care must be taken to properly align the two component optical devices and the ribbon cable (or associated connectors thereof) to enable a desired beam coupling.

As the cost of photonic components for optical devices decreases, the cost of optical connectors and the costs for coupling optical connectors (e.g., with relatively good tolerances or good alignment) to photonic components within an optical device is becoming a larger part of the cost of an optical module, such as a transceiver that includes multiple component optical devices. As the size of optical modules decreases and the performance requirements increase, the available physical space within optical modules for optical connectors decreases. Accordingly, there is a need for a low cost optical connector which reduces the physical spaced used by the optical connector, reduces the alignment costs and difficulties and maintains good tolerances or good alignment with the connected photonic components.

SUMMARY

According to some possible implementations, an optical interconnect device may include a multi-fiber connector at a first end of the optical interconnect device. The optical interconnect device may include an edge coupled connector at a second end of the optical interconnect device. The optical interconnect device may include a plurality of optical fibers disposed inside the multi-fiber connector and the edge coupled connector to optically couple the multi-fiber connector to the edge coupled connector, wherein the multi-fiber connector and the edge coupled connector rigidly interconnect to structurally support the optical interconnect device.

According to some possible implementations, a method may include attaching, by a device, a plurality of optical fibers to a fiber array unit (FAU). The method may include inserting, by the device, the FAU into an opening of a multiple fiber push-on/pull-off (MPO) ferrule to form a rigid optical connector to structurally support the plurality of optical fibers, wherein the rigid optical connector includes an edge coupling end associated with the FAU and an MPO end associated with the MPO ferrule.

According to some possible implementations, an optical module may include a first optical device with a multiple-fiber push-on/pull-off (MPO) connector. The optical module may include a second optical device with an edge coupling connector. The optical module may include a rigid optical connector to optically couple and mechanically couple the first optical device to the second optical device. The rigid optical connector may include a rigid housing including an MPO end to receive the MPO connector and an edge coupling end to receive the edge coupling connector. The rigid optical connector may include a plurality of optical fibers rigidly disposed within the rigid housing to optically couple the MPO end to the edge coupling end.

DETAILED DESCRIPTION

The following detailed description of example implementations refers to the accompanying drawings. The same reference numbers in different drawings may identify the same or similar elements.

As described above, a flexible ribbon cable may be used to optically couple component optical devices inside an optical module, such as a transceiver of an optical communications system. The flexible ribbon cable may be used to couple a first component optical device with a multiple-fiber push-on/pull-off (MPO) connector to a second component optical device that is edge mounted, such as a silicon integrated photonic optical device. Similarly, an array of lenses may be used to optically couple component optical devices. For example, the array of lenses may be used to couple each output of a first component optical device with each input of a second component optical device. However, using a flexible ribbon cable may require an excessive size or excessive physical space, and may result in excessive difficulty in manufacture and assembly. Similarly, a flexible ribbon cable may be associated with a poor alignment tolerance (e.g., an alignment tolerance of approximately 5 millimeters or greater). Furthermore, using an array of lenses may result in manufacturing and/or assembly complexity, and may similarly have a poor alignment tolerance.

Some implementations, described herein, provide an optical interconnect device. For example, the optical interconnect device may be a rigid optical connector that includes a housing, an MPO end, a fiber array unit (FAU) end, and multiple optical fibers of the FAU disposed in the housing, such that the MPO end and the FAU end provide structural support to the multiple optical fibers and enabling optical coupling of multiple component optical devices of an optical module. The optical interconnect device may have reduced size compared to prior optical connectors enabling coupling of optical devices with reduced package size; reduced manufacturing complexity; and/or improved alignment tolerance, such as less than approximately 5 mm, less than approximately 2 mm, less than approximately 1 mm, less than approximately 0.5 mm, less than approximately 0.2 mm, or less than approximately 0.1 mm, and/or the like.

Figure 1:
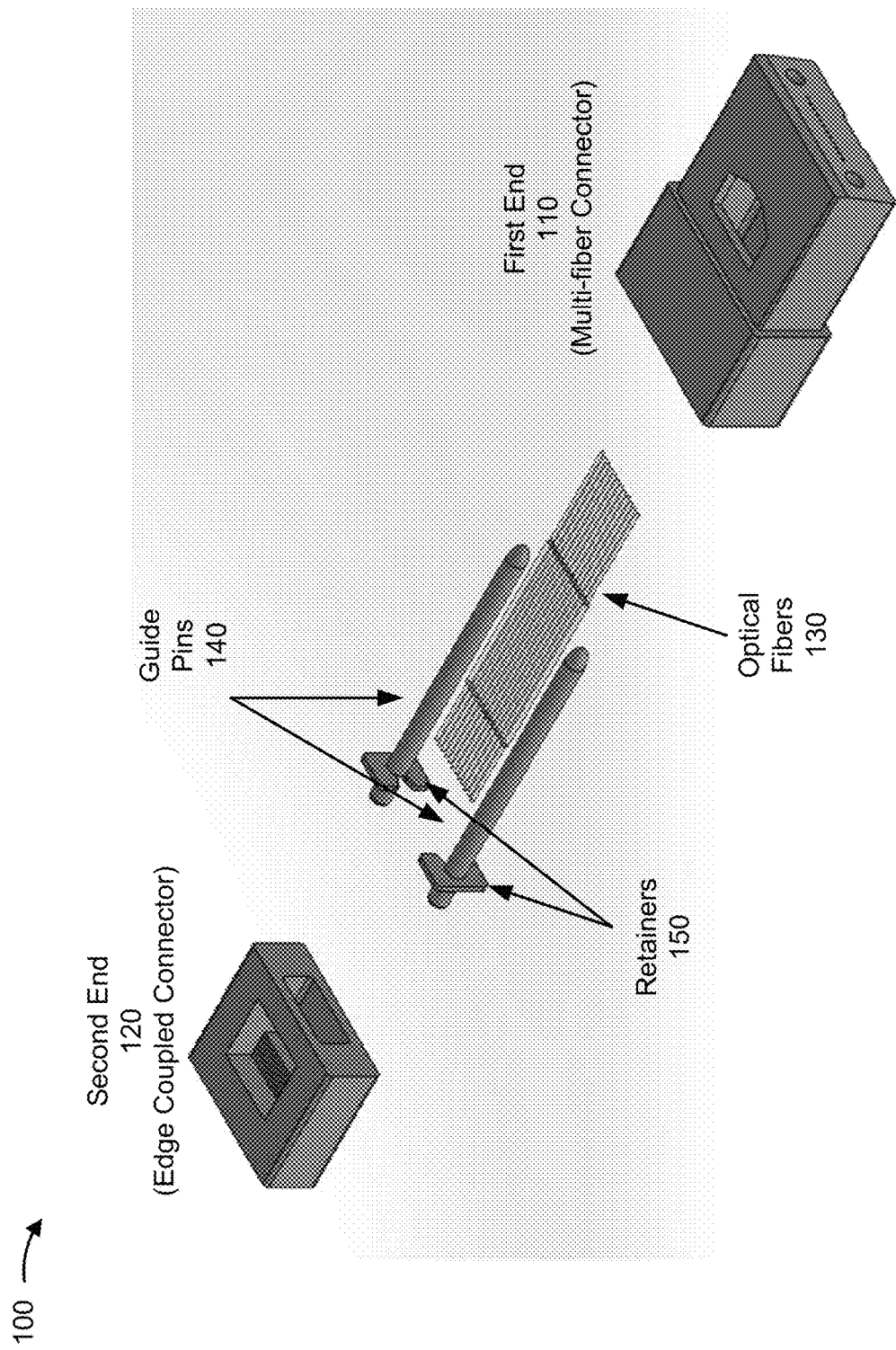
FIG. 1 is a diagram of an example implementation described herein.

FIG. 1 is a diagram of an example implementation of an optical interconnect device 100 described herein. As shown in FIG. 1, optical interconnect device 100 includes a first end 110, a second end 120, and a set of optical fibers 130.

In some implementations, first end 110 may be a multi-fiber connector, such as an MPO connector end, an MTP connector end, and/or the like. For example, first end 110 may plug into a plurality of fibers of an optical device with an MPO connector. In some implementations, first end 110 may include a single row grating array, a multi-row grating array, and/or the like. In some implementations, a length of optical interconnect device 100 from a face of first end 110 to a face of second end 120 is less than approximately 20 millimeters (mm), less than approximately 15 mm, less than approximately 10 mm, and/or the like.

In some implementations, second end 120 may be an edge coupled end of a fiber array unit (FAU), that may be inserted into an opening of first end 110 to form optical interconnect device 100, and provide rigid structural support to optical interconnect device 100. For example, second end 120 may enable second end 120 to edge couple (e.g., mechanically and optically) to a silicon integrated photonic (SIP) optical device, a planar lightwave chip (PLC) optical device, an electro-optical chip (EOC) optical device, and/or the like. In this case, second end 120 holds the set of optical fibers 130, and maintains a rigid alignment of each optical fiber, of the set of optical fibers 130, to the silicon integrated photonic optical device, the planar lightwave chip optical device, the electro-optical chip optical device, and/or the like.

In some implementations, second end 120 may be an angled end. For example, second end 120 may include an angled surface to edge couple to the silicon integrated photonic optical device, as described in more detail herein. In some implementations, second end 120 may be a plastic based material. In some implementations, second end 120 may include a glass based material, a borosilicate based material, and/or the like. In this way, based on using glass for second end 120, second end 120 may provide improved adhesion to the silicon integrated photonic optical device, improved optical performance, improved ultraviolet light curing performance, and/or the like relative to other selected materials.

In some implementations, optical fibers 130 may be a ribbon cable. For example, optical fibers 130 may be a 1×12 ribbon cable of an FAU that forms multiple optical paths to optically couple optical devices connected to first end 110 and to second end 120, and that may be rigidly maintained in a structural position by an interconnection of first end 110 and second end 120. In this way, optical interconnect device 100 may enable optical coupling of a plurality of optical devices and mechanical coupling of the plurality of optical devices.

In some implementations, optical interconnect device 100 may include guide pins 140 and retainers 150. For example, guide pins 140 and retainers 150 may be used to enable assembly and alignment of first end 110 to second end 120 and coupling of optical fibers 130 to first end 110 and second end 120, as described in more detail herein. In some implementations, retainers 150 may be fixed at a particular location on guide pins 140 to enable interconnection of first end 110 to second end 120. For example, first end 110 may include openings to receive guide pins 140 at a first depth controlled by a position of retainers 150, and second end 120 may include openings to receive guide pins 140 at a second depth controlled by the position of retainers 150. In this case, the first depth and the second depth may be selected such that the first end 110 is rigidly coupled to the second end 120 to provide structural support to optical interconnect device 100, to optical fibers 130 therein, and/or the like.

In some implementations, optical interconnect device 100 may include a rigid housing that is formed by first end 110 and second end 120 being mechanically coupled. For example, optical fibers 130 may be inserted into first end 110 and second end 120, and first end 110 and second end 120 may form the rigid housing for optical interconnect device 100, thereby enabling interconnection of an edge coupled optical device and an MPO connector type of optical device. In this case, based on second end 120 being inserted into an opening of first end 110, optical interconnect device 100 may be compact (e.g., a length of optical interconnect device 100 may be less than a sum of the lengths of first end 110 and second end 120), which may enable inclusion in increasingly miniaturized optical modules. For example, optical interconnect device 100 may be included in a transceiver, a multiplexer, a demultiplexer, a transmit optical subassembly (TOSA), a receiver optical subassembly (ROSA), a transmit-receiver optical subassembly (TROSA), and/or the like.

In some implementations, optical interconnect device 100 may include a separate housing that encloses first end 110, second end 120, and optical fibers 130. Additionally, or alternatively, optical interconnect device 100 may include a body portion that is disposed between first end 110 and second end 120. In this case, first end 110, second end 120, and the body portion may form the rigid housing for optical interconnect device 100. In some implementations, a first portion of optical interconnect device 100 may provide mechanical support for a second portion of optical interconnect device 100. For example, first end 110 may provide mechanical support for alignment of second end 120. In this way, optical interconnect device 100 may enable improved durability and alignment relative to using a flexible optical connector, which may be expensive, may require excessive utilization of space, and may lack durability as a result of using epoxy to maintain a position within an optical device.

In this way, an optical interconnect device 100 may be provided to enable optical coupling of a set of optical devices. Moreover, based on providing optical interconnect device 100, a size, cost, complexity, and/or alignment tolerance may be reduced relative to using a flexible optical connector or a lens array to couple the set of optical devices.

As indicated above, FIG. 1 is provided merely as an example. Other examples are possible and may differ from what was described with regard to FIG. 1.

FIGS. 2A-2D are diagrams of example implementations relating to optical interconnect device 100 described herein.

Figure 2A:
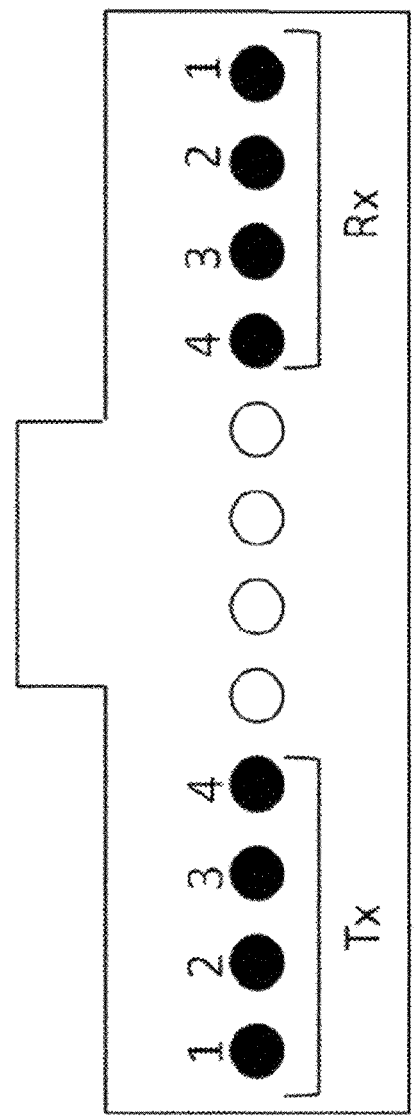
FIGS. 2A-2D are diagrams of example implementations described herein.

As shown in FIG. 2A, first end 110 may include multiple optical ports to form an MPO type of connector to connect to an optical device that includes an MPO type of connector. For example, first end 110 may include a first set of 4 ports allocated for transmission (Tx). Similarly, a second set of 4 ports of first end 110 may be allocated for reception (Rx). Similarly, a third set of 4 ports may be unused, flexibly allocated for transmission and/or reception, or used for other purposes, such as active alignment or testing during manufacture. In this way, first end 110 may enable bidirectional communication between a first optical device and a second optical device coupled using optical interconnect device 100.

Figure 2B:
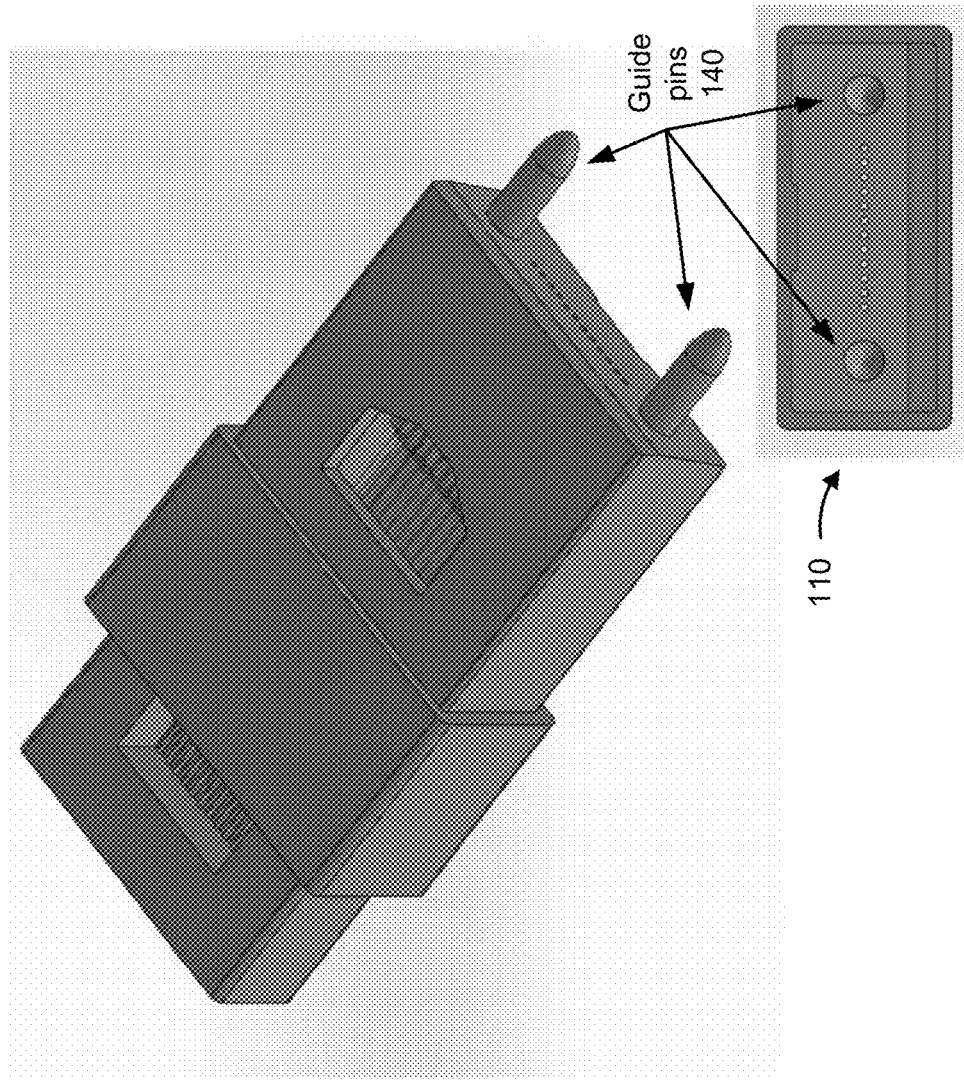

As shown in FIG. 2B, when optical interconnect device 100 is assembled (e.g., first end 110 receives second end 120), guide pins 140 may extend through first end 110 and outward from a face of first end 110 to enable optical interconnect device 100 to mechanically and optically couple to another optical device with an MPO connector. In this case, guide pins 140 enable alignment of optical interconnect device 100 and first end 110 to the other optical device with the MPO connector with less than a threshold alignment tolerance, such as approximately +/−0.1 mm. Additionally, or alternatively, optical interconnect device 100 may be associated with an alignment tolerance of less than approximately +/−5 mm, less than approximately +/−2 mm, less than approximately +/−1 mm, less than approximately +/−0.5 mm, and/or the like. Based on a connection of optical fibers 130 between first end 110 and second end 120 being fixed, guide pins 140 may enable structural support of optical interconnect device 100 and optical coupling of an MPO connector optical device to an edge coupled optical device without alignment difficulty relating to a flexible optical connector or an actively aligned connector.

Figure 2C:
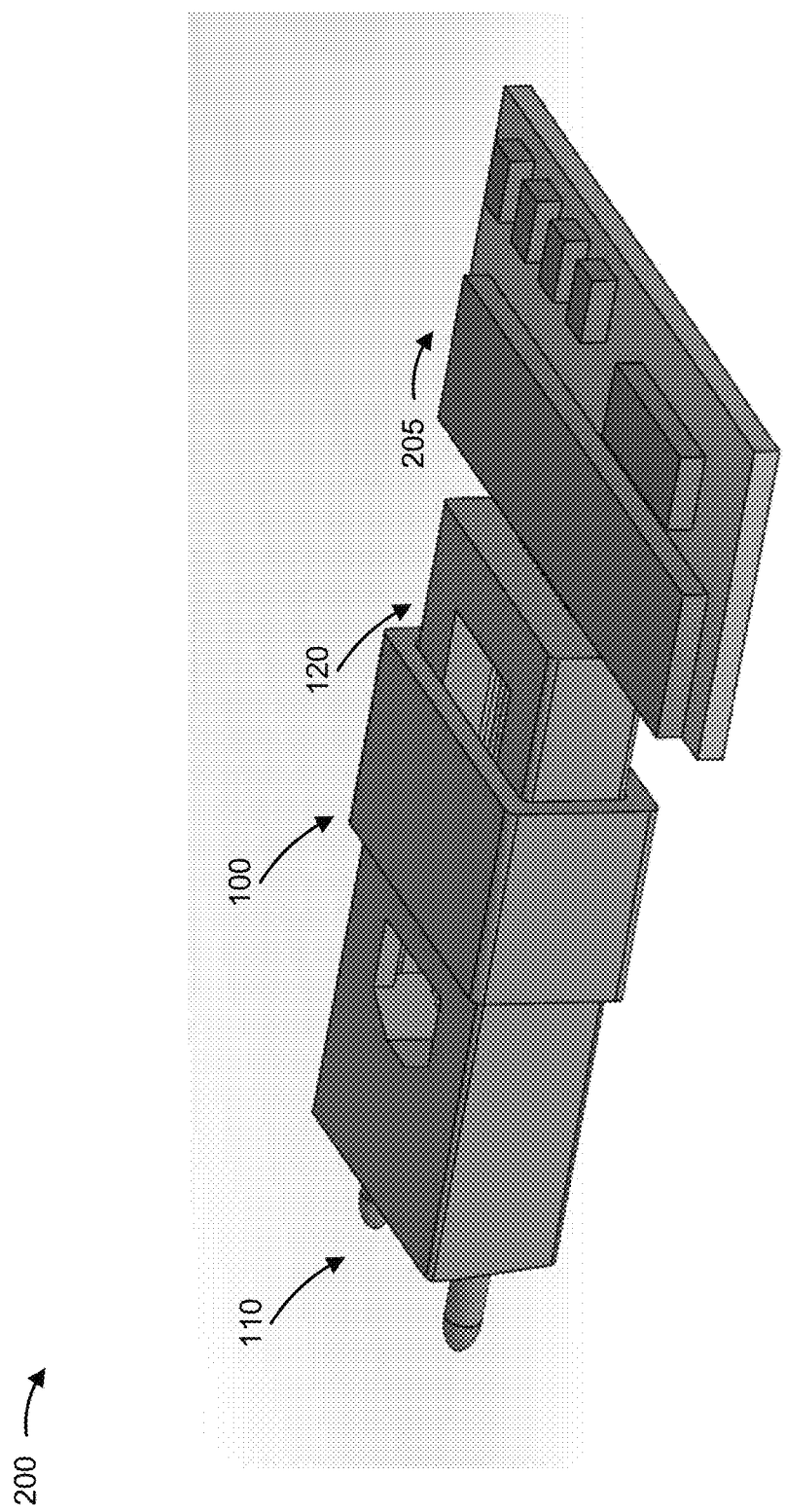

As shown in FIG. 2C, and by diagram 200, second end 120 may optically couple (and mechanically couple) to an optical device 205 using an edge coupling end. For example, second end 120 may include a first set of ports (e.g., 4 ports) allocated for transmission, a second set of ports (e.g., 4 ports) allocated for reception, and/or the like to enable optical device 205 (e.g., which may be an optical device with an edge coupling connector) to couple to an MPO connector optical device via optical interconnect device 100. In this way, second end 120 may enable bidirectional communication between a first optical device and a second optical device (e.g., optical device 205) coupled using optical interconnect device 100.

Figure 2D:
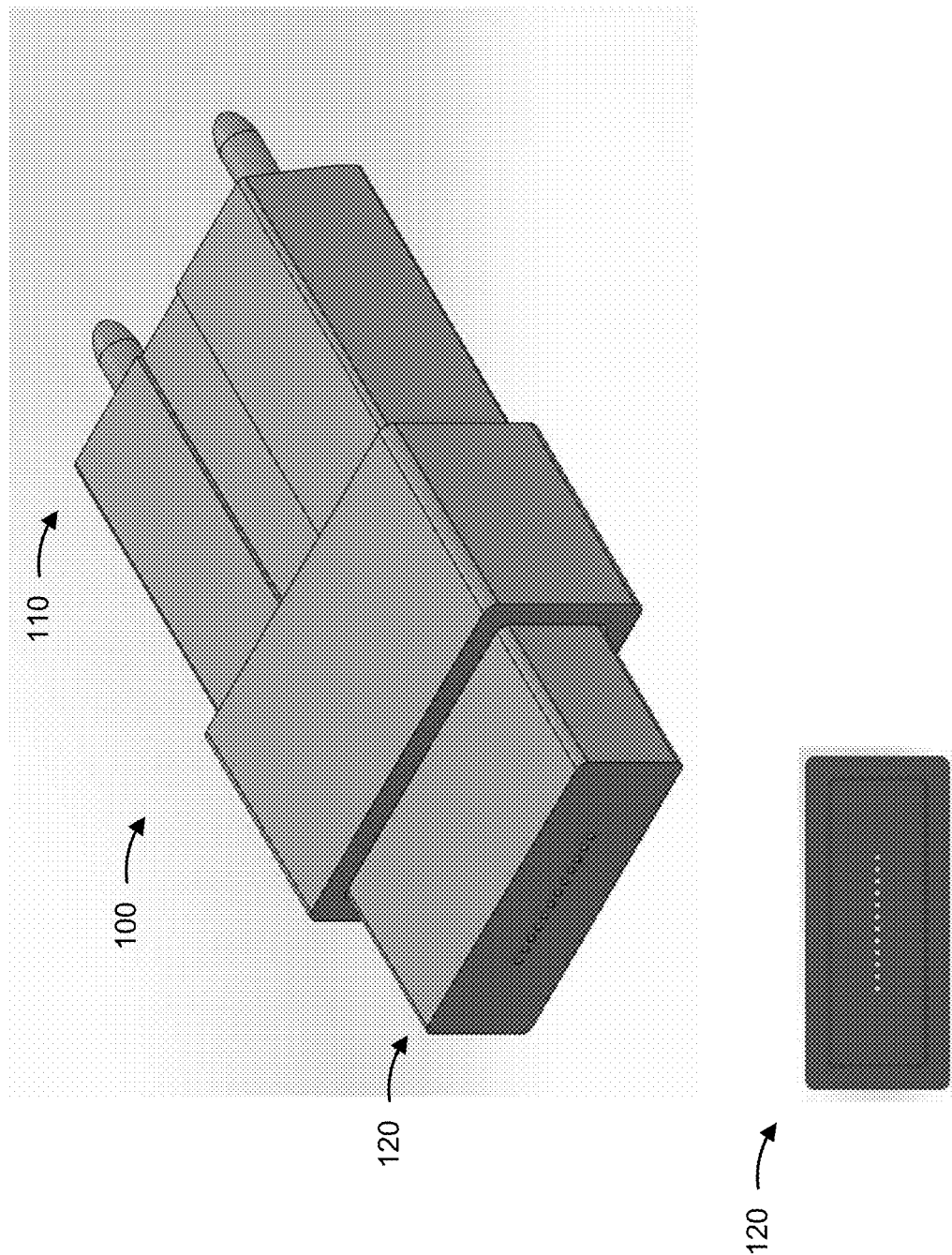

As shown in FIG. 2D, second end 120 may form an end of optical interconnect device 100. For example, second end 120 may form an end of optical interconnect device 100 to receive an edge coupled device, such as optical device 205 shown in FIG. 2C.

As indicated above, FIGS. 2A-2D are provided merely as examples. Other examples are possible and may differ from what was described with regard to FIGS. 2A-2D.

FIGS. 3A-3F are diagrams of example implementations of optical interconnect devices described herein.

Figure 3A:
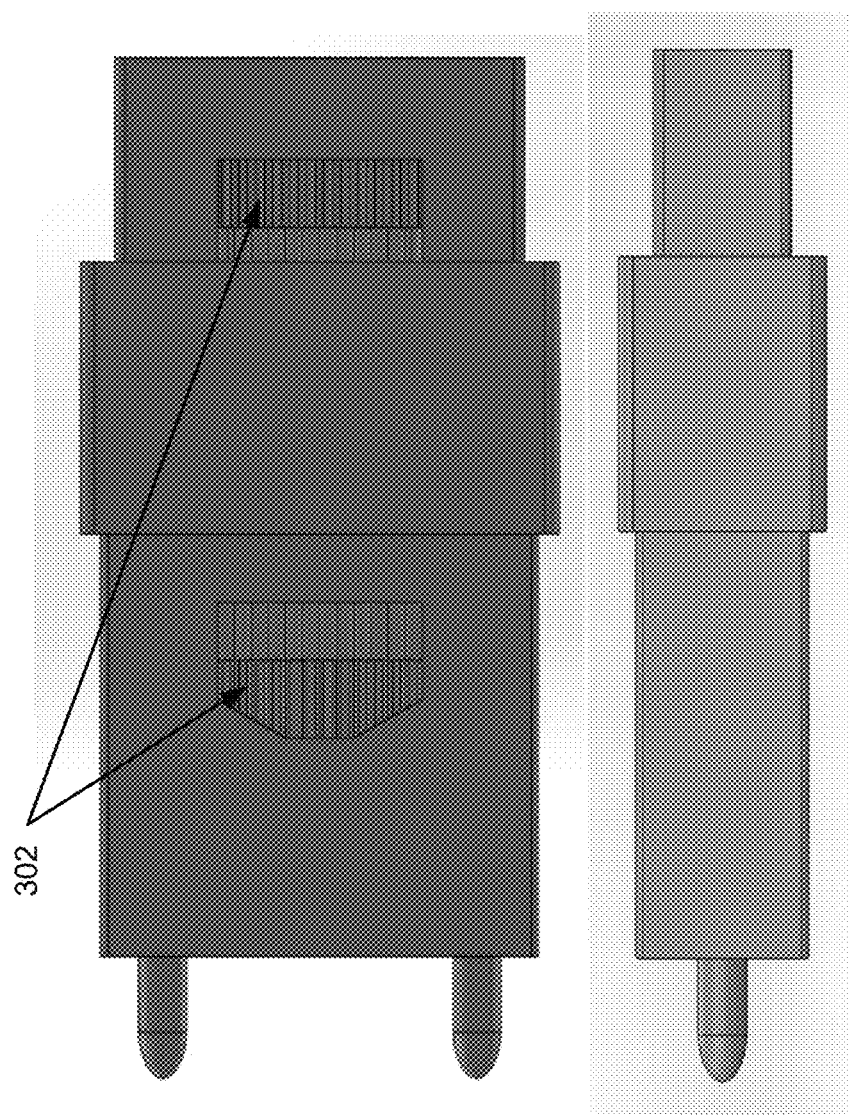
FIGS. 3A-3F are diagrams of example implementations described herein.

As shown in FIG. 3A, an optical interconnect device 300 may be configured as a multi-mode optical connector. As shown by reference number 302, optical interconnect device 300 may include multiple openings in a surface of optical interconnect device 300 to pot optical fibers of optical interconnect device 300. In this way, during manufacture of optical interconnect device 300, the optical fibers may be potted without a negative impact to durability of optical interconnect device 300 or the optical fibers 130 within.

Figure 3B:
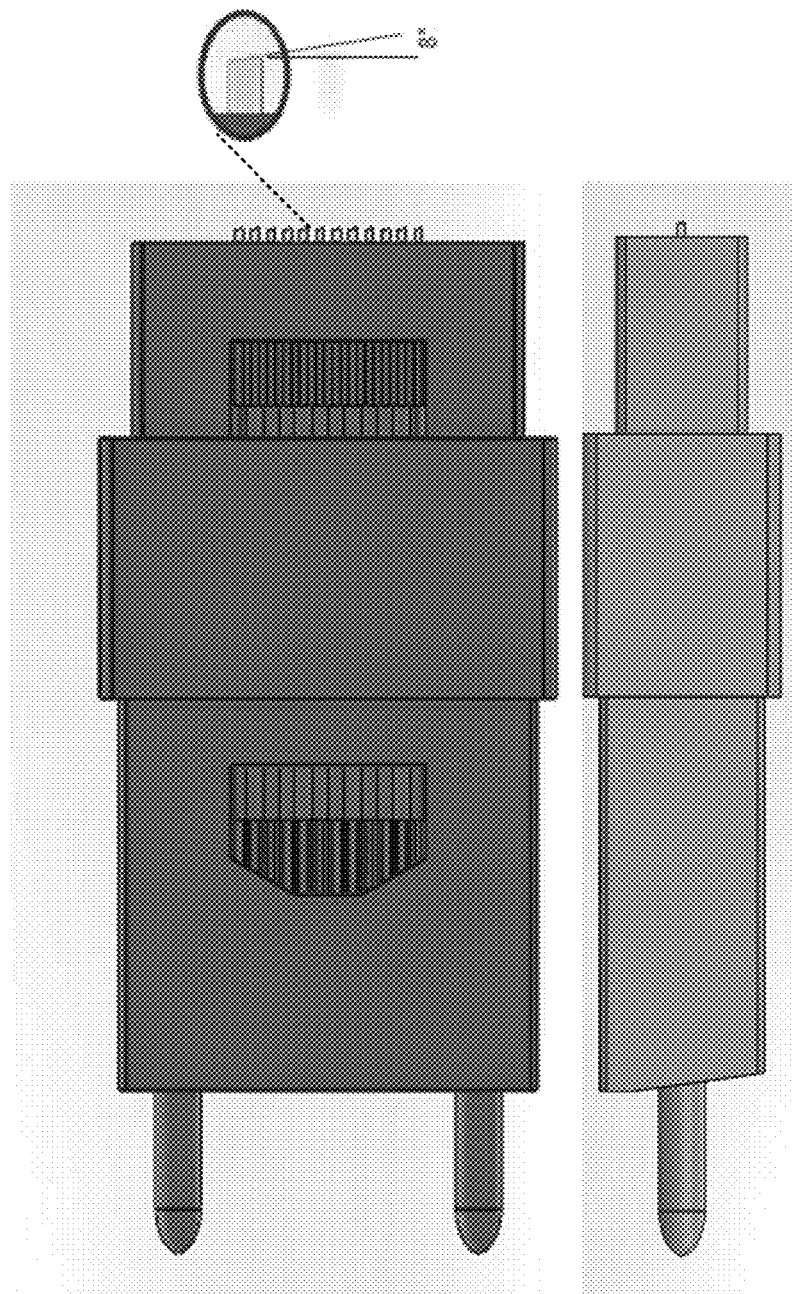

As shown in FIG. 3B, an optical interconnect device 310 may be configured with an angled edge for an edge coupling end. For example, an angle of approximately 8 degrees relative to a normal plane may be used to enable coupling to an optical device with edge coupling end. In this case, optical interconnect device 310 may be a single mode optical connector, and optical fibers 130 of optical interconnect device 310 have ends that may be laser cleaved to form the angled edge. Although described herein in terms of a particular angle of offset from an axis (i.e., 8 degrees), other angles may be possible to enable optical coupling.

Figure 3C:
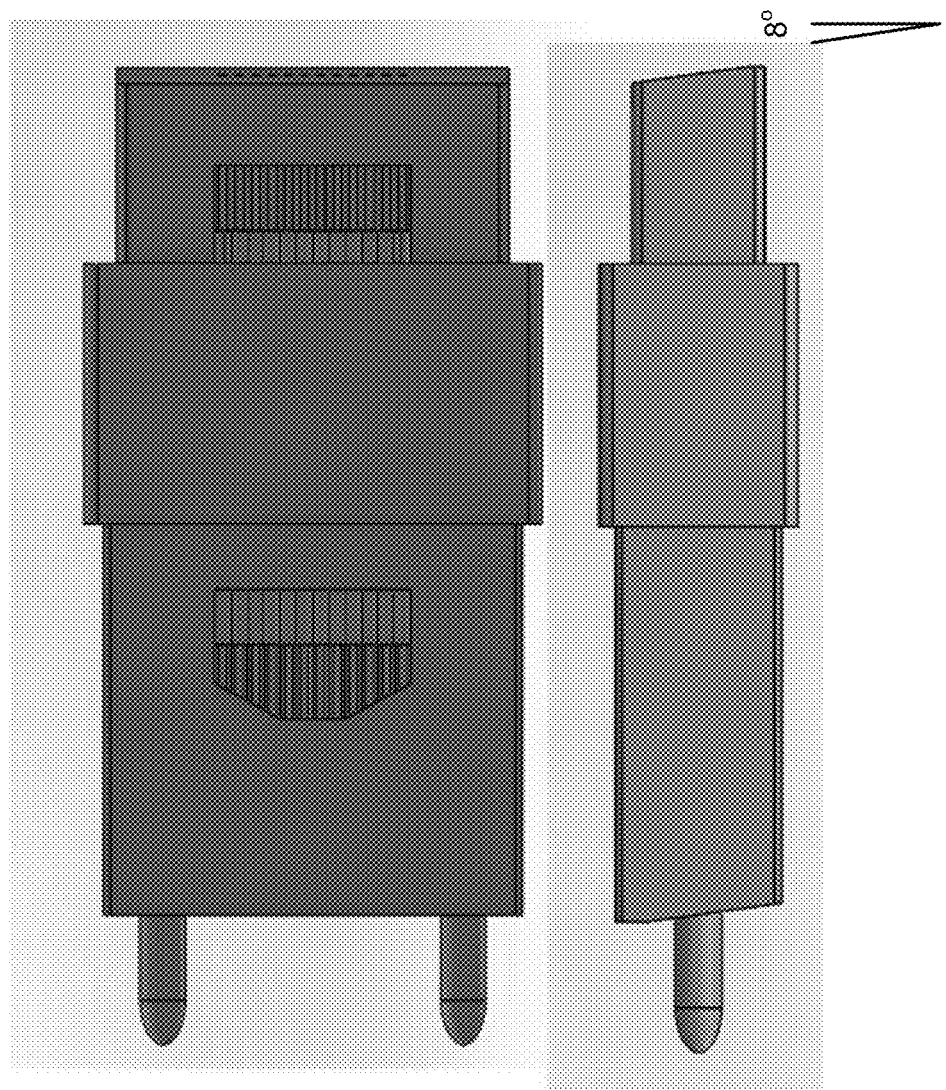

As shown in FIG. 3C, an optical interconnect device 320 may be configured with another type of angled edge for edge coupling end. For example, rather than an angled fiber edge of optical interconnect device 310, optical interconnect device 320 includes an angled surface angled at 8 degrees relative to a normal plane. In this case, optical interconnect device 320 is configured as an angled physical contact single mode optical connector that is angled in a vertical plane (e.g., a plane extending from a top surface of optical interconnect device 320, which includes holes for potting optical fibers 130 (which may be provided with ends at a corresponding angle to the angled surface), to a bottom surface of optical interconnect device 320).

Figure 3D:
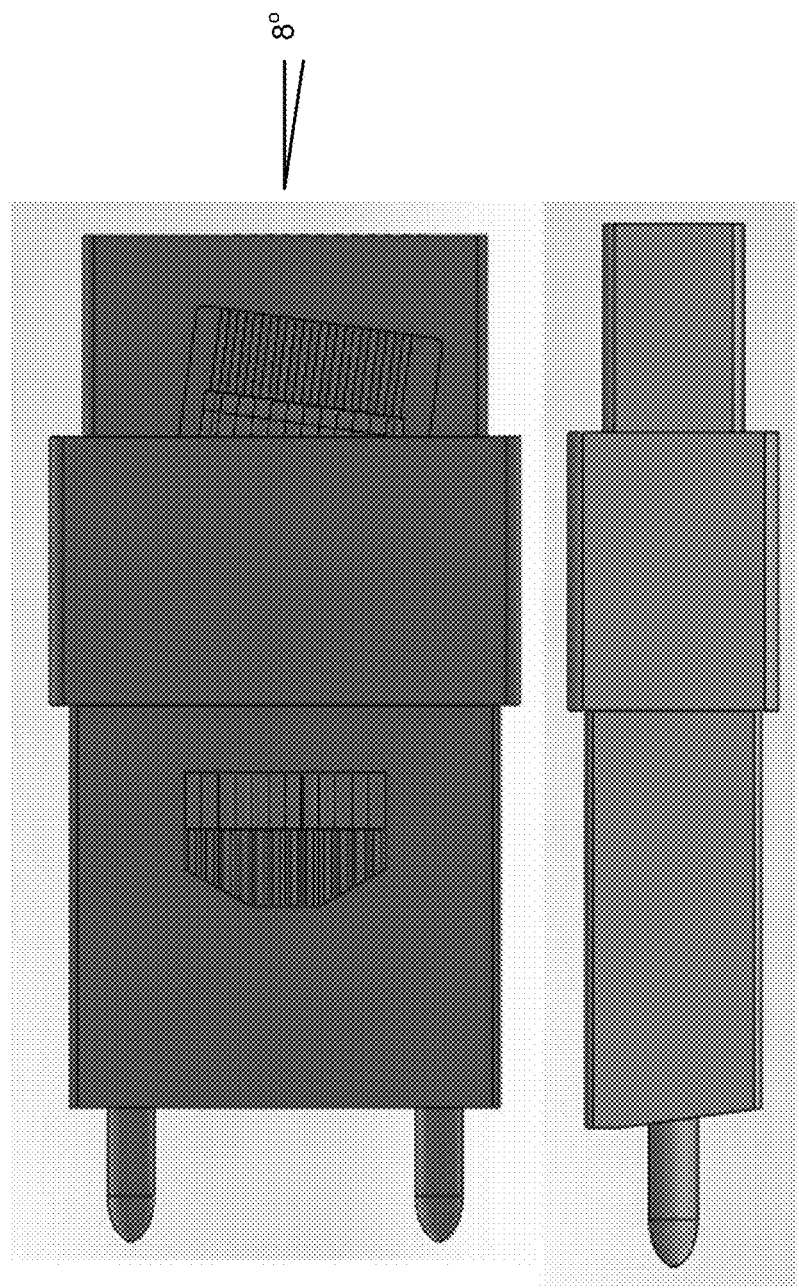

As shown in FIG. 3D, an optical interconnect device 330 may be configured with optical fibers disposed at an angle relative to an axis of optical interconnect device 330. For example, at a first end of optical interconnect device 330, the optical fibers may be disposed parallel to the axis, and at a second end of optical interconnect device 330, the optical fibers may be disposed at an 8 degree angle to the axis. In this case, optical interconnect device 330 is configured as an angled physical contact single mode optical connector that is angled in a horizontal plane (e.g., a plane extending from a first end of optical interconnect device 330 to a second end of optical interconnect device 330) and the optical fibers 130 may not be angled at their ends.

Figure 3E:
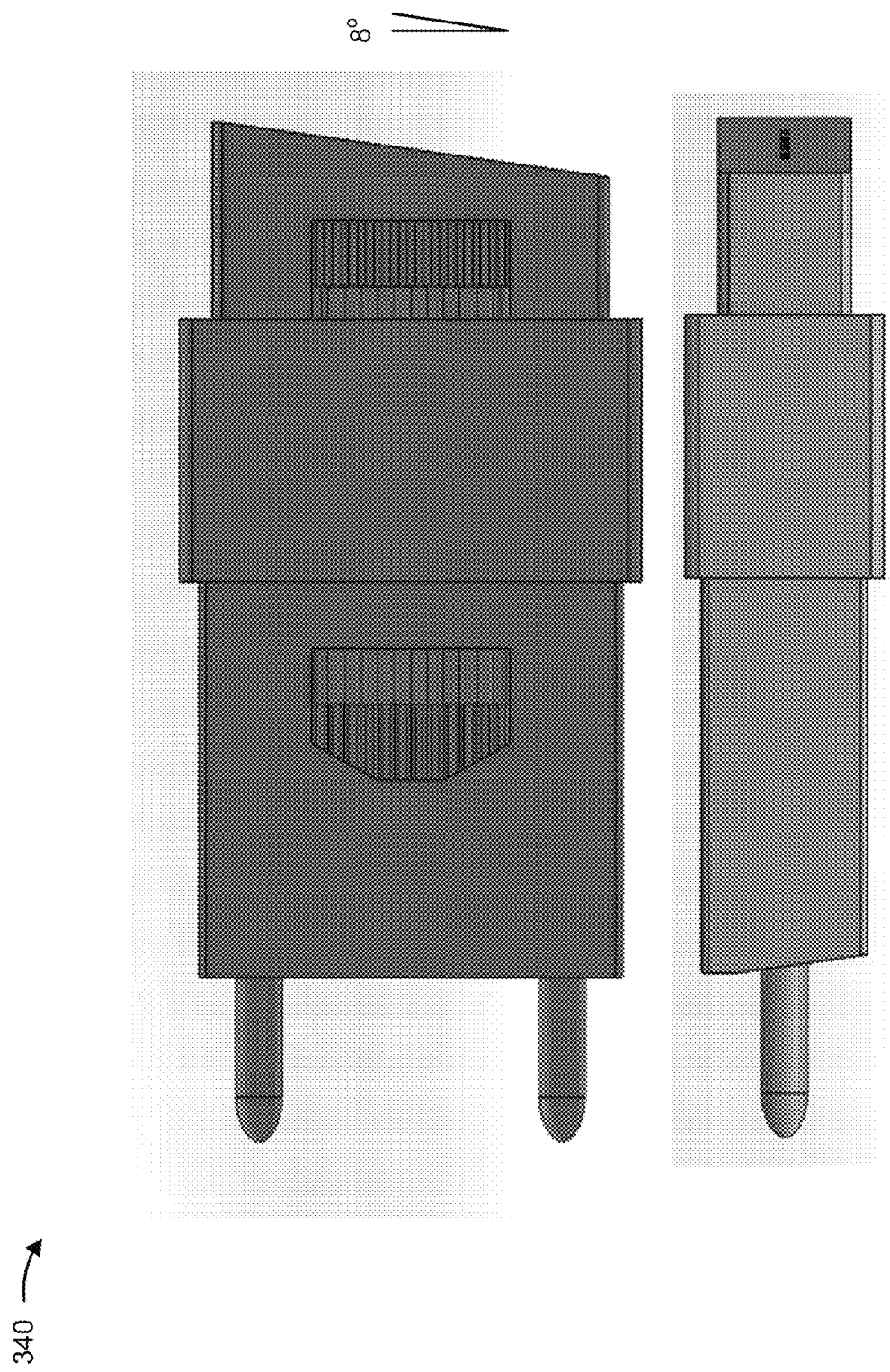

As shown in FIG. 3E, an optical interconnect device 340 may be configured as an angled physical contact single mode optical connector with an end of optical interconnect device 340 disposed at an angle relative to an axis of optical interconnect device 340. For example, an edge coupling end edge may be disposed at an 8 degree angle relative to the axis of optical interconnect device 340 to enable coupling to an edge coupled optical device. In this case, the edge coupling end edge is angled with regard to a plane extending from a first side of optical interconnect device 340 to a second side or optical interconnect device 340, where each of the first side and the second side extend from a first end of optical interconnect device 340 (e.g., the edge coupling end) to a second end of optical interconnect device 340 (e.g., an MPO end) and the optical fibers 130 may be provided at a corresponding angle to the edge coupling end edge.

Figure 3F:
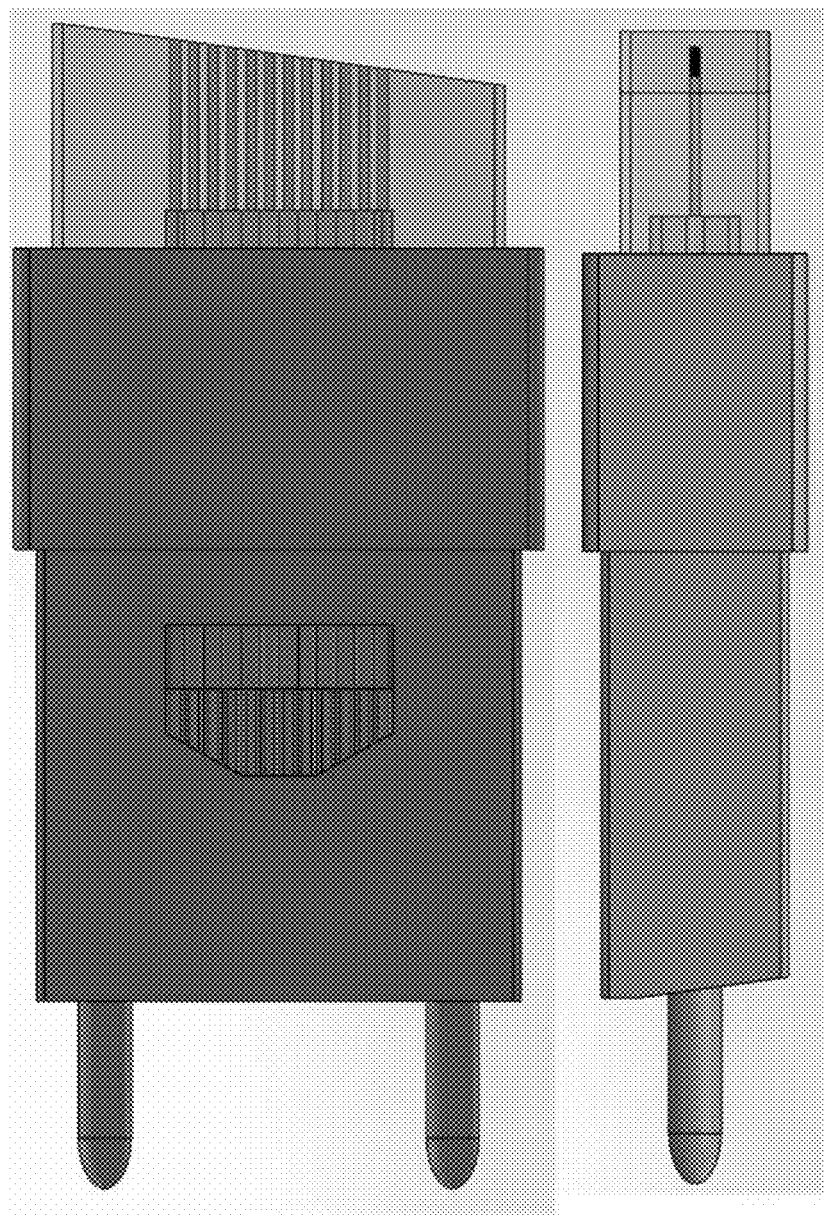

As shown in FIG. 3F, an optical interconnect device 350 may be configured as an angled physical contact single mode optical connector with a glass end, a borosilicate end, and/or the like for the edge coupling end. In this way, optical interconnect device 350 may be associated with improved adhesion to a silicon integrated photonics optical device, improved optical performance, and/or the like. In some embodiments, a glass, borosilicate (or the like) end on the optical interconnect device 350 allows angling, cleaving, polishing or otherwise processing the end of the optical connector and the ends of the optical fibers 130 during the same processing steps.

As indicated above, FIGS. 3A-3F are provided merely as examples. Other examples are possible and may differ from what was described with regard to FIGS. 3A-3F.

Figure 4:
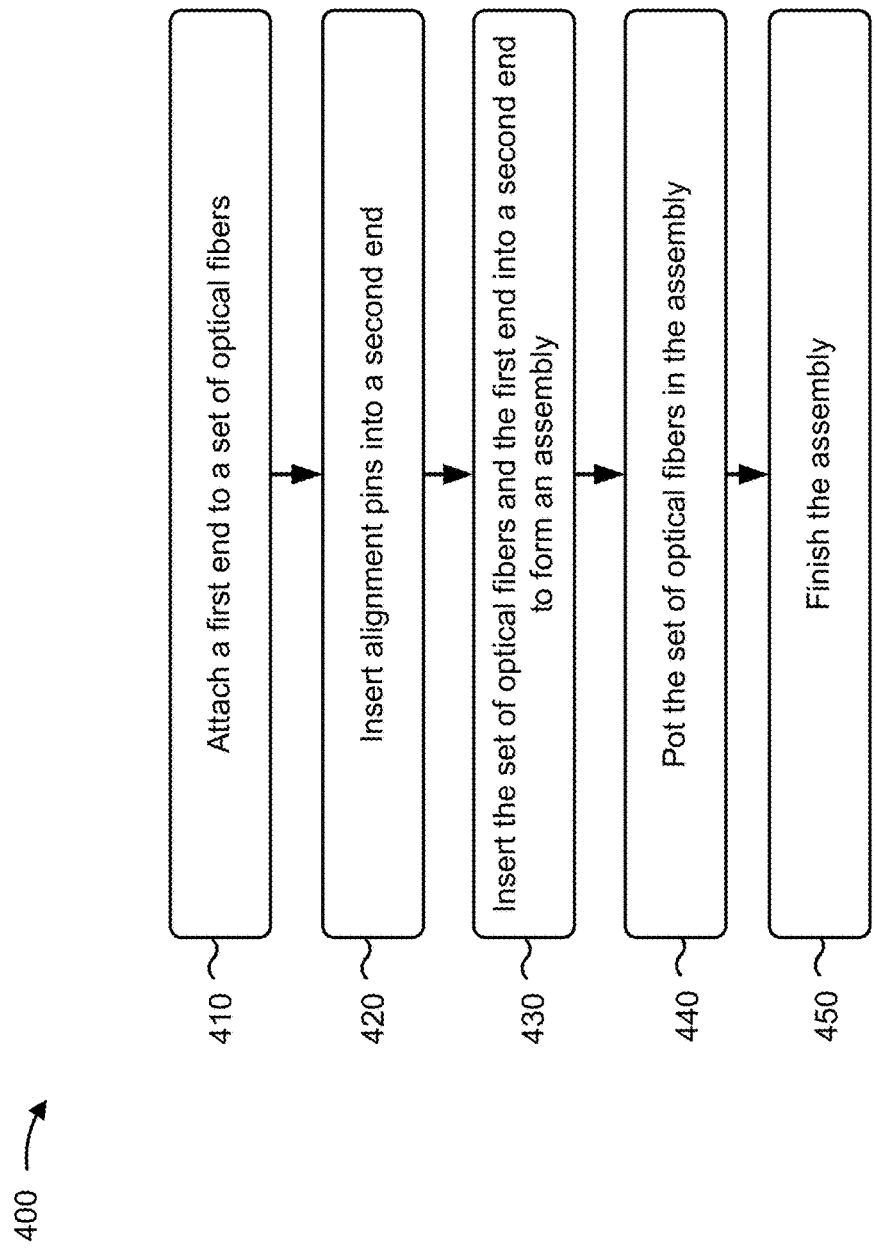
FIG. 4 is a flow chart of an example process for assembling a optical interconnect device described herein.

FIG. 4 is a flow chart of an example process 400 for assembling an optical interconnect device.

As shown in FIG. 4, process 400 may include attaching a first end to a set of optical fibers (block 410). For example, during manufacture, a device (e.g., an automated assembly device) may attach an FAU to a ribbon fiber including the set of optical fibers. In this way, an edge coupling end for an optical interconnect device may be formed.

As further shown in FIG. 4, process 400 may include inserting alignment pins into a second end (block 420). For example, the device may insert the alignment pins into an alignment pin opening of an MPO ferrule to form the second end. In this way, an MPO connector for an optical interconnect device may be formed, and alignment pins may be disposed to extend outward from a face of the second end to enable mechanical alignment of the optical interconnect device to an optical device that includes an MPO connector and to which the optical interconnect device is to be coupled.

As further shown in FIG. 4, process 400 may include inserting the set of optical fibers and the first end into the second end to form an assembly (block 430). For example, the device may insert the connected FAU and set of optical fibers into the MPO ferrule, thereby encapsulating the set of optical fibers and forming an optical interconnect device with an edge coupling end and an MPO connector end. In this case, the alignment pins (and the retainers thereof) may insertion of the FAU and the set of optical fibers into the MPO ferrule.

As further shown in FIG. 4, process 400 may include potting the set of optical fibers in the assembly (block 440). For example, the device may pot the set of optical fibers using an epoxy inserted via an opening in the optical interconnect device described above. In this way, the device may affix the set of optical fibers to enable a durable optical coupling of a first optical device to a second optical device via the optical interconnect device.

As further shown in FIG. 4, process 400 may include finishing the assembly (block 450). For example, the device may cure epoxy used for potting the set of optical fibers, angle, cut or cleave the set of optical fibers, polish the set of optical fibers, the end or edge of the optical connector, and/or the like to enable the optical interconnect device to be used for optical coupling.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the optical interconnect device enables optical coupling for an MPO connector based optical device and an edge coupling based optical device. Moreover, based on providing an optical interconnect device including an MPO end and an edge coupling end of an FAU, the optical interconnect device is associated with a reduced size relative to using a flexible optical connector and improves alignment tolerance relative to the flexible optical connector.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical interconnect device, comprising:
   a multi-fiber connector at a first end of the optical interconnect device;
   an edge coupled connector at a second end of the optical interconnect device;
   a plurality of optical fibers disposed inside the multi-fiber connector and the edge coupled connector to optically couple the multi-fiber connector to the edge coupled connector; and
   a set of alignment pins to align the multi-fiber connector to the edge coupled connector,
      wherein the set of alignment pins extends from the edge coupled connector, through the multi-fiber connector, and outward from a face of the multi-fiber connector opposite the edge coupled connector, and
      wherein the multi-fiber connector and the edge coupled connector rigidly interconnect to structurally support the optical interconnect device.

2. The optical interconnect device of claim 1, wherein the multi-fiber connector is a multiple-fiber push-on/pull-off (MPO) connector.

3. The optical interconnect device of claim 1, wherein the edge coupled connector is a fiber array unit (FAU).

4. The optical interconnect device of claim 1, wherein the edge coupled connector is inserted into the multi-fiber connector such that the plurality of optical fibers attach to the edge coupled connector and the multi-fiber connector to optically couple ends of the optical interconnect device and to structurally support the plurality of optical fibers in the optical interconnect device.

5. The optical interconnect device of claim 1, wherein the optical interconnect device is a multi-mode optical connector.

6. The optical interconnect device of claim 1, wherein the optical interconnect device is to connect to at least one of a silicon integrated photonics (SIP) optical device, an electro-optical chip (EOC) optical device, or a planar lightwave chip (PLC) optical device.

7. The optical interconnect device of claim 1,
wherein a first end of the set of alignment pins is to receive the multi-fiber connector,
wherein a second end of the set of alignment pins is to receive the edge coupled connector, and
wherein the set of alignment pins include a set of retainers disposed on the set of alignment pins to control a depth with which the first end of the set of alignment pins receive the multi-fiber connector and a depth with which the second end of the set of alignment pins receive the edge coupled connector such that the multi-fiber connector is rigidly interconnected with the edge coupled connector.

8. The optical interconnect device of claim 7, wherein the first end of the set of alignment pins extends through the multi-fiber connector and outward from the face of the multi-fiber connector to receive, to mechanically couple, and to optically couple another multi-fiber connector to the multi-fiber connector at the face of the multi-fiber connector.

9. The optical interconnect device of claim 1, wherein the multi-fiber connector includes an opening to receive the edge coupled connector to rigidly interconnect the multi-fiber connector and the edge coupled connector.

10. The optical interconnect device of claim 9, wherein, based on the multi-fiber connector receiving the edge coupled connector in the opening of the multi-fiber connector, a length from the first end to the second end is less than a total length of the multi-fiber connector and the edge coupled connector.

11. A method, comprising:
attaching, by a device, a plurality of optical fibers to a fiber array unit (FAU);
inserting, by the device, the FAU into an opening of a multiple fiber push-on/pull-off (MPO) ferrule to form a rigid optical connector to structurally support the plurality of optical fibers; and
inserting a set of alignment pins into a set of alignment pin openings in the MPO ferrule, such that ends of the set of alignment pins extend from the FAU, through the MPO ferrule, and outward from a face of the MPO ferrule opposite the FAU,
wherein the rigid optical connector includes an edge coupling end associated with the FAU and an MPO end associated with the MPO ferrule.

12. The method of claim 11, further comprising:
potting the plurality of optical fibers using an epoxy and via at least one opening in the rigid optical connector.

13. The method of claim 11, further comprising:
polishing the FAU.

14. The method of claim 11, further comprising:
cleaving at least a portion of the plurality of optical fibers.

15. The method of claim 11, further comprising:
mechanically coupling an optical device to the edge coupling end or the MPO end.

16. The method of claim 11, further comprising:
mechanically coupling a first optical device to the edge coupling end and a second optical device to the MPO end such that the plurality of optical fibers optically couple the first optical device to the second optical device.

17. An optical module, comprising:
a first optical device with a multiple-fiber push-on/pull-off (MPO) connector;
a second optical device with an edge coupling connector; and
a rigid optical connector to optically couple and mechanically couple the first optical device to the second optical device, comprising:
a rigid housing including an MPO end to receive the MPO connector and an edge coupling end to receive the edge coupling connector,
a plurality of optical fibers rigidly disposed within the rigid housing to optically couple the MPO end to the edge coupling end, and
a set of alignment pins to align the MPO end to the edge coupling end,
wherein the set of alignment pins extends from the edge coupling end, through the MPO end, and outward from a face of the MPO end opposite the edge coupling end.

18. The optical module of claim 17, wherein the optical module includes at least one of:
a multiplexer,
a transceiver,
a transmit optical subassembly (TOSA),
a receiver optical subassembly (ROSA), or
a transmit-receiver optical subassembly (TROSA).

19. The optical module of claim 17, wherein the rigid optical connector is configured with at least one of:
an angled fiber edge, relative to a normal plane, for the edge coupling end,
an angled surface edge, relative to the normal plane, for the edge coupling end,
optical fibers disposed at an angle relative to an axis of the rigid optical connector, or
an edge coupling end edge angled with respect to a plane extending from a first side of the rigid optical connector to a second side of the rigid optical connector.

20. The optical interconnect device of claim 1, wherein the optical interconnect device is associated with an alignment tolerance of less than approximately +/−5 mm.

* * * * *